United States Patent [19]

Taya et al.

[11] Patent Number: 5,264,179
[45] Date of Patent: Nov. 23, 1993

[54] METHOD OF REMOVING DISSOLVED OXYGEN IN A BOILER WATER SYSTEM

[75] Inventors: Shiro Taya, Shinjuku; Akitomo Terada, Shiki, both of Japan

[73] Assignee: Kurita Water Industries Ltd., Tokyo, Japan

[21] Appl. No.: 743,348

[22] PCT Filed: Dec. 11, 1990

[86] PCT No.: PCT/JP90/01609
§ 371 Date: Aug. 6, 1991
§ 102(e) Date: Aug. 6, 1991

[87] PCT Pub. No.: WO91/09154
PCT Pub. Date: Jun. 27, 1991

[30] Foreign Application Priority Data
Dec. 20, 1989 [JP] Japan .................. 1-330380

[51] Int. Cl.$^5$ .................. C23F 11/10
[52] U.S. Cl. .................. 422/16; 252/397;
252/398; 252/399; 252/400.61; 252/400.62; 252/401
[58] Field of Search .................. 422/14, 15, 16, 17, 422/18, 19; 252/397, 398, 399, 400.61, 400.62, 401–407

[56] References Cited

U.S. PATENT DOCUMENTS

| 3,562,103 | 2/1971 | Moser . | |
|---|---|---|---|
| 5,013,481 | 5/1991 | Taya | 422/12 |

FOREIGN PATENT DOCUMENTS

| 0170743 | 2/1986 | European Pat. Off. . |
| 0369584 | 5/1990 | European Pat. Off. . |
| 54-026250 | 2/1979 | Japan . |
| 54-118390 | 9/1979 | Japan . |
| 56-133469 | 10/1981 | Japan . |
| 57-007225 | 1/1982 | Japan . |
| 61-053375 | 3/1986 | Japan . |

*Primary Examiner*—Timothy M. McMahon
*Attorney, Agent, or Firm*—Kanesaka and Takeuchi

[57] ABSTRACT

An oxygen scavenger for a boiler water system comprising a starch derivative in which 0.01 to 5% by weight of sulfur- or nitrogen-containing groups, as S or N, are introduced to a starch with DE (dextrose equivalent) of 1% or higher, as well as a method of scavenging dissolved oxygen in a boiler water system by adding the oxygen scavenger for a boiler water system to a boiler water system.

6 Claims, No Drawings

METHOD OF REMOVING DISSOLVED OXYGEN IN A BOILER WATER SYSTEM

BACKGROUND OF THE INVENTION

1. Field of the Invention

The present invention concerns an oxygen scavenger for a boiler water system and a method of removing dissolved oxygen in a boiler water system and, more in particular, it relates to an oxygen scavenger for a boiler water system which is highly safe to a human body and does not result in the reduction of concentration in a dissolving tank, that is, a chemical for scavenging dissolved oxygen in a boiler water system and a method of removing dissolved oxygen in a boiler water system by using the chemical.

2. Description of the Prior Art

Oxygen dissolved in water causes corrosion of metal materials to shorten the life of various kinds of apparatus (for example, boiler and heat exchanger) or pipelines. In view of the above, an oxygen scavenger has been blended and used in various kinds of boiler feedwater systems for removing dissolved oxygen in water. Heretofore, hydrazine has been used most generally as the oxygen scavenger. Since reaction products of hydrazine with oxygen is nitrogen and water, it has an advantageous merit of not increasing the dissolved solid matters in the boiler water and enabling concentration control of hydrazine. However, since there is a worry of causing undesired effects on a human body, it has not been used to a system using raw steams. On the other hand, there is a sodium sulfite which is authorized food additives as a highly safe oxygen scavenger but, since it reacts too rapidly with oxygen, it has a drawback of causing reduction of concentration in a chemical dissolving tank and rather promoting corrosion in the boiler tube.

On the other hand, starch has been used long since as a corrosion inhibitor use in boilers.

Further, an aqueous oxygen scavenging composition comprising 100 parts by weight of an alkali metal sulfite and 0.05 to 20 parts of dextrin added thereto has been proposed (Japanese Patent Laid Open Sho 57-7225), in which dextrin is blended for improving the stability of the sulfite and the oxygen scavenging effect is provided by the sulfite.

Although starch has been used as the boiler corrosion inhibitor, it has not been known as an oxygen scavenger. In addition, natural starch has a drawback that the viscosity is high and the handling is not easy.

It is possible to increase DE (dextrose equivalent: reducing sugar is measured as glucose and DE is defined as a ratio of the reducing sugar to solid content) and make it into a cold water soluble starch by acidolysis, enzymolysis and oxidative decomposition. However, if the thus obtained starch is added as it is to boiler water as an oxygen scavenger, since it greatly consumes P-alkalinity in the boiler water, there is a problem that the combined use of the alkali agent is inevitable. On the other hand, in the composition as described in Japanese Patent Laid Open Sho 57-7225, since the oxygen scavenger as the main ingredient is alkali metal sulfite, the foregoing corrosion problem in the boiler has not yet been dissolved.

OBJECT AND SUMMARY OF THE INVENTION

An object of the present invention is to dissolve the foregoing problems in the prior art and provide an oxygen scavenger for a boiler water system which is highly safe and excellent in handlability, does not reduce the concentration in a chemical dissolving tank, and shows remarkably less consumption for P-alkalinity, as well as a method of removing dissolved oxygen in a boiler water system.

The oxygen scavenger for a boiler water system according to the present invention comprises a starch derivative, in which sulfur- or a nitrogen-containing groups are introduced by from 0.01 to 5% by weight as S or N, into a starch with DE of 1% or higher.

A method of removing dissolved oxygen in a boiler water system according to the present invention comprises adding, to a boiler water system, a starch derivative in which sulfur- or a nitrogen-contanining groups are introduced by from 0.01 to 5% by weight as S or N, into a starch with DE of 1% or higher.

The starch derivative according to the present invention has an excellent oxygen scavenging function, and is excellent in handlability since it is water soluble, as well as it is less toxic and highly safe. Further, it does not bring about the reduction of concentration in a chemical dissolving tank (chemical injection tank). In addition, it does not result in the reduction of P-alkalinity in the boiler water system.

It is not apparent for the reason why the starch derivative according to the present invention does not consume the P-alkalinity, but it is estimated that sulfur-or nitrogen-containing groups introduced into hydroxy groups of the starch suppress the consuming reaction of the P-alkalinity in water as less as possible.

DESCRIPTION OF THE PREFERRED EMBODIMENT

The present invention will now be described more in details.

As the raw material starch for the starch derivative used in the oxygen scavenger for a boiler water system according to the present invention, there can be used natural starch such corn starch, potato starch, sweet potato starch, tapioca starch and/or processed starch such as esterified starch, oxidized starch and etherified starch. Although there is no particular restriction on the starch derivative used in the present invention so long as it is soluble in cold water and soluble under heating, the starch derivative soluble in cold water is preferred in view of handling. As the starch derivative soluble in cold water, the raw material starch as described above which is rendered soluble in cold water, for example, by an acidolysis, enzymolysis or oxidative decomposition can be used. The starch derivative in the present invention preferably has DE of 1% or higher and, preferably from 2 to 30%.

If DE is lower than 1%, the addition amount required for oxygen removal becomes remarkable. On the other hand, if DE is in excess of 30%, although it can be used as the starch in the present invention, it results in extremely high temperature and needs cooling upon formulation in admixture with an alkali.

The starch derivative according to the present invention comprises 0.01 to 5% by weight of sulfur- or nitrogen-containing groups as S or N, introduced to hydroxy group of such a starch.

Although there is no particular restriction for sulfur- or nitrogen-contanining group, there can be mentioned, as the sulfur-containing group, for example, hydrogen sulfite such as sodium hydrogen sulfite or potassium hydrogen sulfite, and as the nitrogen-containing group, hydrazine or its derivative such as hydrazine, methyl hydrazine and diethyl hydrazine and, amine derivative such as ammonia, hydroxy amine, methyl amine, cyclohexyl amine, diethylethanol amine, dimethylethanol amine, monoethanol amine, isopropanol amine, morpholine, diethylaminoethyl chloride, dimethylamino chloride, 3-chloro-2-hydroxypropyltrimethyl ammonium chloride.

The content of the sulfur- or nitrogen-containing group is from 0.01 to 5% by weight, preferably, 0.5 to 3% by weight, more preferably, 1 to 3% by weight as S or N, to the starch derivative obtained. If the content of the sulfur- or nitrogen-containing group is out of the above-mentioned range, it is not preferred since the consumption amount for P-alkalinity during use is increased.

There is no particular restriction on the method of introducing the sulfur- or nitrogen-contanining groups to the aldehyde groups of the starch and ordinary synthetic reaction for processed starch is properly used. For instance, starch and a sulfur or nitrogen-containing compound, that is, a compound capable of introducing sulfur or nitrogen-containing group in starch are mixed and stirred at a temperature about from a room temperature to 50° C. for about 0.5 to 72 hours. The reaction formula in a case of using a sulfite is as shown below.

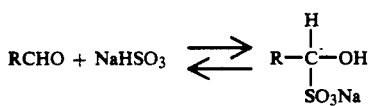

in which R is a starch residue.

The reaction product may, depending on a case, contain a partially unreacted starting compound but it may be served as it is for the use. Further, if necessary, it is used after purification by a customary method.

The oxygen scavenger for a boiler water system according to the present invention can contain 1 to 100% by weight of such a starch derivative.

Further, the oxygen scavenger for a boiler water system according to the present invention may contain, as a pH controller or a softening agent other chemicals such as NaOH, $Na_2CO_3$, metal salt of phosphoric acid, for example, trisodium phosphate, tripotassium phosphate, sodium hexamethaphosphate, phosphoric acid, sulfuric acid, ammonia and hydrazine. Further, it may be used in combination with such chemicals upon use. In this case, there is no particular restriction on the ratio used and the chemicals mentioned above can be used within a wide range of 1 to 99% by weight based on the starch derivative.

When the oxygen scavenger is used in a boiler water system according to the present invention in accordance with the method of scavenging dissolved oxygen in a boiler water system according to the present invention, for instance, an aqueous solution in which the starch derivative is dissolved to a concentration of 0.01 to 50% by weight is added into an object aqueous system by using a chemical pump.

The addition amount may be such an amount as removing dissolved oxygen in the water and, since the oxygen scavenging performance varies depending on DE of the starch, the addition amount may be determined previously by a simple test.

The present invention will now be described more specifically referring to reference examples, examples and comparative examples, but the present invention is not restricted to the following examples unless it does not exceed the gist thereof.

Preparation Method for Cold Water Soluble Starch

REFERENCE EXAMPLE 1

100 parts by weight of corn starch (as anhydrous state) was dispersed in 170 parts by weight of water as a slurry, and pH was adjusted to 7.0 with $Ca(OH)_2$. After adding 0.27 parts by weight of $\alpha$-amylase (titer: 10,000 unit/g), it was succharified by heating and, after maintaining 90° C. for 40 min, the residual enzyme was deactivated. Then, after filtration, it was purified by an ion exchange resin and then dried by a spray dryer. DE of the resultant cold water soluble starch was 10.7%.

REFERENCE EXAMPLE 2

Processing was conducted in the same manner as in Reference Example 1 except for maintaining at 90° C. for 180 min. DE of the resultant starch soluble in cold water was 23.0%.

REFERENCE EXAMPLE 3

Processing was conducted in the same manner as in Reference Example 1 except for maintaining at 90° C. for 20 min. DE of the resultant cold water soluble starch was 5.0%.

REFERENCE EXAMPLE 4

Processing was conducted in the same manner as in Reference Example 1 except for not maintaining at 90° C. for 40 min, but directly deactivating the residual enzyme. DE of the resultant starch soluble in cold water was 0.5%.

Preparation Method for Starch Derivative Soluble in Cold Water

EXAMPLE 1

100 parts by weight of the cold water soluble starch obtained in Reference Example 1 was dissolved into 100 parts by weight of water, to which 3.07 parts by weight of $NaHSO_3$ was mixed and reacted. The S-atom content in the product starch was 0.98%.

EXAMPLE 2

0.16 parts by weight of $NaHSO_3$ was added and reacted with the starch soluble in cold water obtained in Reference Example 1. The S-atom content in the product starch was 0.05%.

EXAMPLE 3

100 parts by weight of the starch soluble in cold water obtained in Reference Example 1 was dissolved into 100 parts by weight of water, to which 0.03 parts by weight of $NaHSO_3$ was reacted at a room temperature for 48 hours. After filtration, washing and drying, the N-atom content in the resultant product starch was 0.01%.

EXAMPLE 4

Processing was conducted in the same manner as in Example 3 except for using 10 parts by weight of a 60% aqueous hydrazine solution to the starch soluble in cold water obtained in Reference Example 1. The N-atom content in the resultant product starch was 1.94%

EXAMPLE 5

100 parts by weight of the starch soluble in cold water obtained in Reference Example 1 was dissolved into 92 parts by weight of water, to which 2.9 parts by weight of NaOH and 5.09 parts by weight of diethyl aminoethyl chloride hydrogen chloride were added and reacted at 45° C. for 3 hours. The N-atom content in the resultant product starch was 0.43%.

EXAMPLE 6

Processing was conducted in the same manner as in Example 4 except for using 0.3 parts by weight of a 60% aqueous hydrazine solution. The N-atom content in the resultant product starch was 0.05%.

EXAMPLE 7

Processing was conducted in the same manner as in Example 4 except for using 0.05 parts by weight of a 60% aqueous hydrazine solution. The N-atom content in the resultant product starch was 0.01%.

EXAMPLE 8

Quaternary ammonium starch (N-atom content: 0.45%) obtained by reacting corn starch and 3-chloro-2-hydroxypropyl ammonium chloride was decomposed under the presence of sulfuric acid at a room temperature to obtain a starch insoluble in cold water with DE of 2. The N-atom content of the product was 0.44%.

EXAMPLE 9

2.67 parts by weight of $NaHSO_3$ was mixed with the starch soluble in cold water obtained in Reference Example 2 and reacted. The S-atom content in the resultant production starch was 0.82%.

EXAMPLE 10

Processing was conducted in the same manner as in Example 9 except for using 14 wt. % of a 60% aqueous hydrazine solution to a starch soluble in cold water obtained in Reference Example 3. The N-atom content in the resultant product starch was 2.8%.

EXAMPLE 11

Oxygen Scavenging Test

Softened water of the following quality was supplied under a feed rate of 13 l/hr to a 6-liter autoclave (steam generator (10% blow)) at a pressure of 10 kg/cm².

Water Quality of Softened water
pH : 7.8
M-alkalinity : 45 mg/l
P-alkalinity : 300 mg/l
Dissolved oxygen : 3.5 mg/l In this case, chemicals in Example 1-7 were added each by 30 mg/l to the supplied water by using a constant volume pump, and the boiler water was concentrated by 10 times to set pH at 11.3. Steams were sampled at the point of the stream exit and the amount of dissolved oxygen in the streams was measured by a dissolved oxygen electrode. P-alkalinity in the boiler water was measured, and the conditions of temperature and pressure were 175° to 180° C. and 10 kg/cm², respectively. The results are shown in Table. 1.

As shown in Table 1, it is apparent that the oxygen scavenger of the present invention is excellent in the oxygen scavenging effect and scarcely reduces the P-alkalinity.

COMPARATIVE EXAMPLES 1-6

An oxygen scavenging test was conducted in the same procedures as those in Example 11 except for using the following chemicals.

| | |
|---|---|
| Starch soluble in cold water | (Comparative Example 1) |
| Hydrazine | (Comparative Example 2) |
| Sodium hydrogen sulfite | (Comparative Example 3) |
| Starch in Reference Example 4 introduced with 0.40% of diethylaminoethyl group | (Comparative Example 4) |
| Starch in Reference Example 1 introduced with 0.005% of methyl hydrazine | (Comparative Example 5) |
| Starch in Reference Example 2 introduced with 7.8% of sodium hydrogen sulfite | (Comparative Example 6) |

The results are collectively shown in Table 1.

From comparison between Example 1 and Comparative Examples 1-6, it is apparent that the present invention shows a remarkable performance.

TABLE 1

| Oxygen Scavenger Starch derivative | *DE (%) | S/N Content (%) | Removed Oxygen Amount (mg/l) | P-alkalinity (mg-CaCO₃/l) |
|---|---|---|---|---|
| Example | | | | |
| 1 NaHSO₃ | 10.7 | 0.98/— | 2.8 | 283 |
| 2 NaHSO₃ | 10.7 | 0.05/— | 2.3 | 136 |
| 3 NaHSO₃ | 10.7 | 0.01/— | 2.3 | 130 |
| 4 Hydrazine | 10.7 | —/1.94 | 2.0 | 246 |
| 5 Dimethyl aminoethyl | 10.7 | —/0.43 | 2.3 | 188 |
| 6 Hydrazine | 10.7 | —/0.05 | 2.4 | 140 |
| 7 Hydrazine | 10.7 | —/0.01 | 2.7 | 124 |
| Comparative Example | | | | |
| 1 Cold water soluble starch | 10.7 | —/— | 2.4 | 27 |
| 2 Hydrazine only | — | — | 3.0 | 305 |
| 2 NaHSO only Comparative Example | — | — | 3.5 | 305 |
| 4 Dimethyl-aminoethyl | 0.5 | —/0.4 | 1.5 | 70 |
| 5 Methyl hydrazine | 10.7 | —/0.005 | 2.5 | 60 |
| 6 NaHSO₃ | 23.0 | 7.80 /— | 1.0 | 250 |

*DE of starting starch

EXAMPLE 12

Test for reduction of concentration in chemical tank

Chemicals shown in Table 2 were stored each by 50 liter as an aqueous 10% solution in a chemical tank to examine the change of concentration with elapsed time.

The results are shown in Table 2.

From Table 2, it is apparent that the oxygen scavenger for a boiler water system according to the present invention causes no reduction in the concentration in the chemical tank.

TABLE 2

| | Residual concentration (%) | | | | |
|---|---|---|---|---|---|
| | | Starch derivative | | | |
| Days elapsed (day) | Na₂SO₃ | Starch Soluble in cold water (Ref. Ex. 1) | NAHSO₃ (Ex. 1) | Hydrazine (Ex. 4) | Diethyl amino-amino-ethyl (Ex. 5) |
| 0 | 10 | 10 | 10 | 10 | 10 |

TABLE 2-continued

| Days elapsed (day) | Na$_2$SO$_3$ | Residual concentration (%) | | | |
|---|---|---|---|---|---|
| | | Starch derivative | | | |
| | | Starch Soluble in cold water (Ref. Ex. 1) | NAHSO$_3$ (Ex. 1) | Hydrazine (Ex. 4) | Diethyl amino-amino-ethyl (Ex. 5) |
| 1 | 9 | 10 | 10 | 10 | 10 |
| 3 | 7 | 10 | 10 | 10 | 10 |
| 7 | 5 | 10 | 10 | 10 | 10 |

As has been described above specifically, the oxygen scavenger for a boiler water system, as well as method of removing dissolved oxygen in a boiler water system according to the present invention can provide effects, for example;

(1) Corrosion of equipments (boiler heat exchanger or the like) can be prevented by removing dissolved oxygen in water.
(2) Since solubility is satisfactory, it is excellent in workability and handlability.
(3) Since it does not react with dissolved oxygen in the chemical tank and causes no concentration reduction, stable injection is possible.
(4) Since it is not toxic and highly safe to a human body, it is applicable to all kinds of boiler water systems, and it is extremely usefully industrially.

What is claimed is:

1. A method of scavenging dissolved oxygen in a boiler water system which comprises adding, to a boiler water system, a starch containing 0.01 to 5% by weight of nitrogen-containing group, said 0.01 to 5% being an amount converted as N, said nitrogen-containing group being a hydrazine derivative or an amine derivative and being introduced into aldehyde group of the starch, said starch having DE (dextrose equivalent) of 1% or higher.

2. A method as defined in claim 1, wherein DE of the starch is 2 to 30%.

3. A method as defined in claim 1, wherein the nitrogen-containing group is hydrazine, methylhydrazine or ethylhydrazine.

4. A method as defined in claim 1, wherein the nitrogen-containing group is hydroxy amine, methyl amine, cyclohexyl amine, diethylethanol amine, dimethylethanol amine, monoethanol amine, isopropanol amine, morpholine, diethyl amino ethyl chloride, dimethyl amine chloride or 3-chloro-2-hydroxypropyl trimethyl ammonium chloride.

5. A method as defined in claim 1, wherein the nitrogen-containing group is introduced in an amount from 0.5 to 3% by weight converted as N.

6. A method of scavenging dissolved oxygen in a boiler water system as defined in claim 1, wherein a solution containing the starch dissolved therein at a concentration of 0.01 to 50% by weight is added to a boiler water system.

* * * * *